(12) United States Patent
Harsh et al.

(10) Patent No.: US 7,721,219 B2
(45) Date of Patent: May 18, 2010

(54) EXPLICITLY DEFINING USER INTERFACE THROUGH CLASS DEFINITION

(75) Inventors: Michael R. Harsh, Kirkland, WA (US); Brian K. Pepin, Seattle, WA (US); Nikhil Kothari, Sammamish, WA (US); Andrew Cheng-min Lin, Seattle, WA (US); Julien Jacques Nicolas Ellie, Redmond, WA (US); Simon Calvert, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 979 days.

(21) Appl. No.: 10/909,512

(22) Filed: Aug. 2, 2004

(65) Prior Publication Data

US 2006/0041877 A1 Feb. 23, 2006

(51) Int. Cl.
*G06F 3/00* (2006.01)
*G06F 17/00* (2006.01)
*G06F 3/048* (2006.01)

(52) U.S. Cl. .................. 715/762; 715/239; 715/760

(58) Field of Classification Search ......... 715/762–763, 715/143, 234, 236, 239, 746, 760; 717/143
See application file for complete search history.

(56) References Cited

U.S. PATENT DOCUMENTS

| 5,673,401 | A | 9/1997 | Volk et al. |
| 6,333,753 | B1 | 12/2001 | Hinckley |
| 6,448,981 | B1 | 9/2002 | Kaczmarski |
| 6,448,987 | B1 * | 9/2002 | Easty et al. ................. 715/834 |
| 6,469,714 | B2 | 10/2002 | Buxton et al. |
| 6,480,856 | B1 | 11/2002 | McDonald et al. |
| 6,968,538 | B2 * | 11/2005 | Rust et al. ................... 717/108 |
| 7,032,180 | B2 * | 4/2006 | Wilkinson et al. .......... 715/762 |
| 2003/0046401 | A1 * | 3/2003 | Abbott et al. ............... 709/228 |

OTHER PUBLICATIONS

Mueller et al., "Using XML to Semi-Automatically Derive User Interfaces", Proceedings of the Second International Workshop on User Interfaces to Data Intensive Systems (UIDIS'01), May 31-Jun. 1, 2001, pp. 91-95, copyright 2001 IEEE.*

Hoschek, "A Database for Dynamic Distributed Content and its Application for Service and Resource Discovery", International IEEE Symposium on Parallel and Distributed Computing (ISPDC 2002), Iasi, Romania, Jul. 2002, available from http://edms.cern.ch/file/341097/1/ispdc2002-1.pdf.*

(Continued)

*Primary Examiner*—William L Bashore
*Assistant Examiner*—Andrew Tank
(74) *Attorney, Agent, or Firm*—Workman Nydegger

(57) ABSTRACT

The present invention relates to systems and methods that provide automatic generation of user interfaces via creation of a class-based model. A system is provided that facilitates generating a user interface. The system includes a class component to generally define properties and methods associated with one or more interface actions. A service component parses the class to automatically generate all or a portion of a user interface from the interface actions. Push and Pull-type models can be provided to facilitate merging of actions from various classes such as provided by third parties or from existing component developments.

23 Claims, 13 Drawing Sheets

OTHER PUBLICATIONS

Karamasoft UltimatePanelTM program, as evidenced by the Internet Wayback Machine Archive.org: "http://www.karamasoft.com/PanelSuite/UltimatePanel.aspx", Feb. 6, 2003.*

PropertyGrid Class, MSDN Library, http://msdn.microsoft.com/library/default.asp?url=/library/en-us/cpref/html/frlrfsystemwindowsformspropertygridclasstopic.asp, 2005.

DesignerVerb Class, MSDN Library, http://msdn.microsoft.com/library/defaultasp?url=/library/en-us/cpref/html/frlrfsystemcomponentmodeldesigndesignerverbclasstopic.asp, 2005.

B. Milosavljevic, et al. User Interface Code Generation for EJB-based Data Models using Intermediate Form Representations. Proceedings of the 2nd International Conference on Principles and Practice of Programming in Java, 2003. 4 pages.

K. Stirewalt and S. Rugaber. Automating UI Generation by Model Composition. Journal of Automated Software Engineering, vol. 7, No. 2, 1998. 11 pages.

* cited by examiner

| 500 | | | | | | |
|---|---|---|---|---|---|---|
| DESIGNER ACTION ITEM | DESIGNER ACTION ITEM CLASS | DESIGNER ACTION ITEM CONSTRUCTOR | CATEGORY PROPERTY | DESCRIPTION PROPERTY | DISPLAY NAME PROPERTY | PROPERTIES PROPERTY | RELATED ITEMS PROPERTY |

| DESIGNER ACTION VERB ITEM |
|---|
| DESIGNER ACTION VERB ITEM CLASS |
| DESIGNER ACTION VERB ITEM CONSTRUCTOR |

FIG. 10

EXPLICITLY DEFINING USER INTERFACE THROUGH CLASS DEFINITION

TECHNICAL FIELD

The present invention relates generally to computer systems and more particularly, the present invention relates to automatic generation of user interface components that are dynamically controlled and viewed via an abstract class definition of the components.

BACKGROUND OF THE INVENTION

Modern computing systems support a large number of applications serving a large number of diverse users. Even though hardware processing and memory has continued to increase in performance, software continues to outpace these advances in the number of new features that are developed to support new and existing applications. Using the cell phone as an example, many features are available for setting desired operations of the device including the type and loudness of a ring, phone directories, menu commands, inbox settings, display settings, security settings, and so forth. In addition to phone capabilities, other hardware features and associated software are beginning to appear on cell phones such as digital cameras and web services. In more complicated systems such as operating systems, software development systems, or advanced communications architectures, the number of features for any given application can be extensive.

To develop and design sophisticated software technologies, development tools can be employed that enable development of a wide range of computing applications. Such applications may include, for example, web applications, extensible markup language (XML) applications, and traditional client applications. As part of the development process, a user may view, manage, and manipulate a number of objects within the development environment. Such objects may include, for example, forms, controls, components, text strings, and other like elements associated with the development process. The development tool may employ a number of development interfaces that enable the user to interact with such objects.

One such development interface is referred to as a Designer. Generally, the Designer enables the user to add, align, position, view, manage, and manipulate forms and controls. A form is an object that enables the presentation of information to the user and the acceptance of input information from the user. A form may expose properties and methods which define its appearance and behavior, and events which define its interaction with the user. By setting its properties and writing code to respond to its events, a user may customize a form to meet the requirements of an application. One manner in which to define a user interface for a form is to place controls on the form's surface.

A control is an object that is contained within a form. A control may be an object such as, for example, a data grid view, a drop down list, a combo-box, a button, a check-box, as well as non-visual components, for example. Each type of control generally has its own set of properties, methods, and events that make it suitable for a particular purpose. The Designer enables a user to add controls to a form. For example, the Designer may enable a control to be added to a form by dragging and dropping the control from a server management console or a logical data source interface. When a control is added to a form, the Designer enables the control to be aligned and positioned within the form.

Conventional development tools may employ a combination of user interfaces such as traditional menus, shortcut menus, status bars, and toolbars to expose tasks and commands to the user and alert the user to important information within an application. Traditional menus hold commands, grouped by a common theme. Toolbars use buttons to expose frequently used commands. Context menus "pop up" in response to a right-click of the mouse and hold commonly used commands for a particular area of an application. Often, context menus are assigned to controls, and provide particular commands that relate to the control to which they are assigned. Status bars indicate an application state or provide information about a corresponding entity in the application that has a focus, such as a menu command.

One problem facing the development of the software components described above involves the somewhat rigid nature in which components developed under one system interact with components designed for another. For instance, software components specified under the conditions of one operating system or language environment may have difficulty interfacing to components specified for another system. This often leads to complicated pieces of code being written and debugged to enable code interactions between different systems. In other cases, components may have to be re-designed completely in order to operate in a different environment.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that support a class-based structure that generalizes the specification and implementation of interfaces such as controls to a development environment. In one aspect, a development object model is provided that includes a class that defines a set of actions (e.g., described in an action list) composed of properties and methods. The methods can function as links or buttons (or other interface components) on an interface palette for example, whereas the properties relate to user interface editors associated with the property's type. A control developer then implements a method to return the properties and methods in the desired order of display or presentation to a user. In this manner, components designed for one type of operating system or language can be efficiently integrated with a subsequent system via generalized declarations of the class in the subsequent system.

In general, the class provides an abstract description for interfaces that can be automatically added to existing interfaces or structures. For instance, third party developers can generate interface components in one system that can then be implemented as all or part of an interface by another developer in a subsequent system even though the systems are different (e.g., interface developed for a Macintosh system employed in a Windows system, component designed for a web-based XML system employed in a desktop windows environment). Also, the class-based structure of the present invention supports dynamic operations between objects that interact with the model. For example, an interface component may be pulled or pushed into an interface that relates to a set-up/installation file or wizard for a subsequent component. Upon execution of the set-up or installation process, object metadata indicates that the installation has been completed, wherein the interface for the set-up can be automatically or dynamically removed from view based upon detected changes in the object's condition.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 5 is a diagram illustrating a Designer action item in accordance with an aspect of the present invention.

FIG. 10 is diagram illustrating a Designer action verb item in accordance with an aspect of the present invention.

DETAILED DESCRIPTION OF THE INVENTION

The present invention relates to systems and methods that provide automatic generation of user interfaces via creation of a class-based model. In one aspect, a system is provided that facilitates generating an interface. The system includes a class component to generally define properties and methods associated with one or more interface actions. A service component parses the class to automatically generate all or a portion of a user interface from the interface actions. Push and Pull-type models can be provided to facilitate merging of actions from various classes such as provided by third parties or from existing component developments.

As used in this application, the terms "component," "service," "model," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
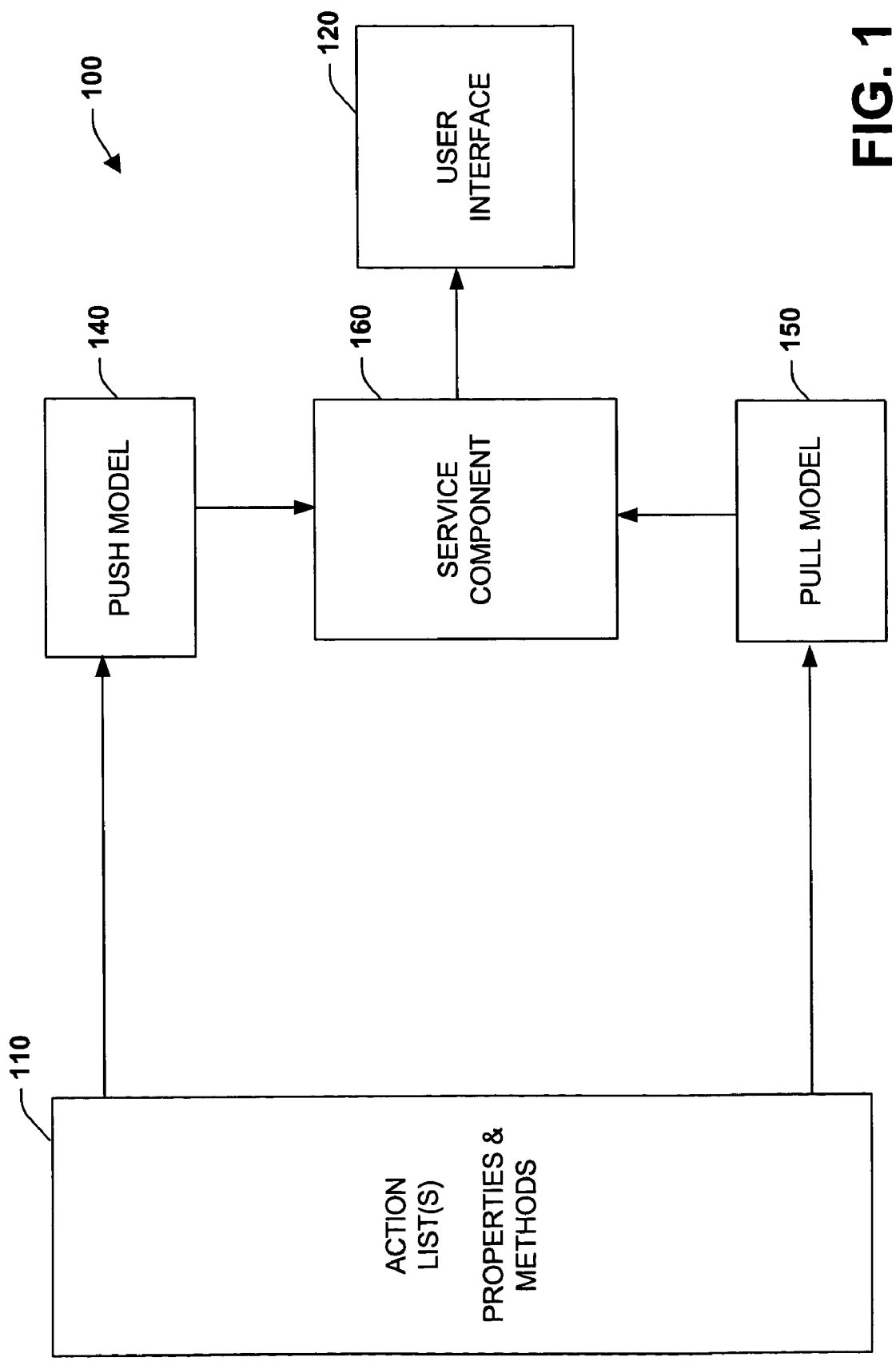
FIG. 1 is a schematic block diagram illustrating a class-based interface generation architecture in accordance with an aspect of the present invention.

Referring initially to FIG. 1, a system 100 illustrates a class-based interface generation architecture in accordance with an aspect of the present invention. The system 100 includes one or more action lists 110 that specify interface actions or events in a generalized manner that can appear on a user interface 120. The action list 110 forms an abstract base class in which control or interface code designers inherit from. In one aspect, the action list 110 (or lists) is distributed via a push model 140 and/or a pull model 150 to a service component 160 that determines which actions or interface options should function and/or appear within the interface 120. Generally, developers add properties and methods to the action list 110 and implement an abstract method (e.g., Get Items) to return an array (or other structure) of actions in the order the actions should appear at the user interface 120.

In one example, the methods declared in the action list 110 can provide links, buttons (or other interface types described below) on the interface 120 (e.g., Palette) and the associated properties can provide user interface Type Editors of the property's type. The control or interface developer then implements a method to return the properties and methods in the order they should be displayed or operate at the interface 120.

When the class is created, it can be added to a control or interface in at least two scenarios—in accordance with the push model 140 and the pull model 150 described as follows:

Pull model: This provides a mechanism for processing classes and to enable other classes and associated items to be merged.

Push model: This is provided with a global service in which user code can push Action List classes into a repository or database. These can be merged with other classes.

In one aspect of the subject invention, the abstract classes described above form a Designer Action object model that provides a useful mechanism for specifying helper commands for a control or other type interface. The model enables developers to specify a list of properties and commands that can change dynamically over time based on the state of other objects (e.g., state as transmitted through object metadata). For instance, some user interface components may be transitory in nature (e.g., a helper or tool tip display for a introductory task) that is provided for a short time until a task is achieved or message relayed. After the task is achieved, the transitory interface components can be automatically removed from the interface 120 based upon the detected state of the object. As can be appreciated, hidden components or actions can automatically be engaged or appear based on the object state. The object model also allows associating one or more of the lists 110 with various components in a designer and/or to merge many of these lists into a single unit before it is presented to the user. Also, lists from various sources can be merged into specific categories that are defined by one or more action items.

It is noted that the action lists 110 can specify a plurality of different type interfaces having various functionality. For instance, in one example, the action list 110 may specify a panel attached to an interface control's selection user interface. The panel offers up tasks to bring up a modal user interface (e.g., create Data Source wizard), operate directly on the control (e.g., remove a column) and make a selection (e.g., choose between views of a control). The panel can appear automatically when a control is added to a form. The system 100 can support operations with other type languages and applications, for example, web applications, extensible markup language (XML) applications, and other software applications. Thus, the action lists 110 enable users to view, manage, and manipulate a number of objects within the system 100. Such objects may include, for example, forms, controls, components, display objects, audio, video, text strings, and other like elements associated with an interface and/or development process.

Figure 2:
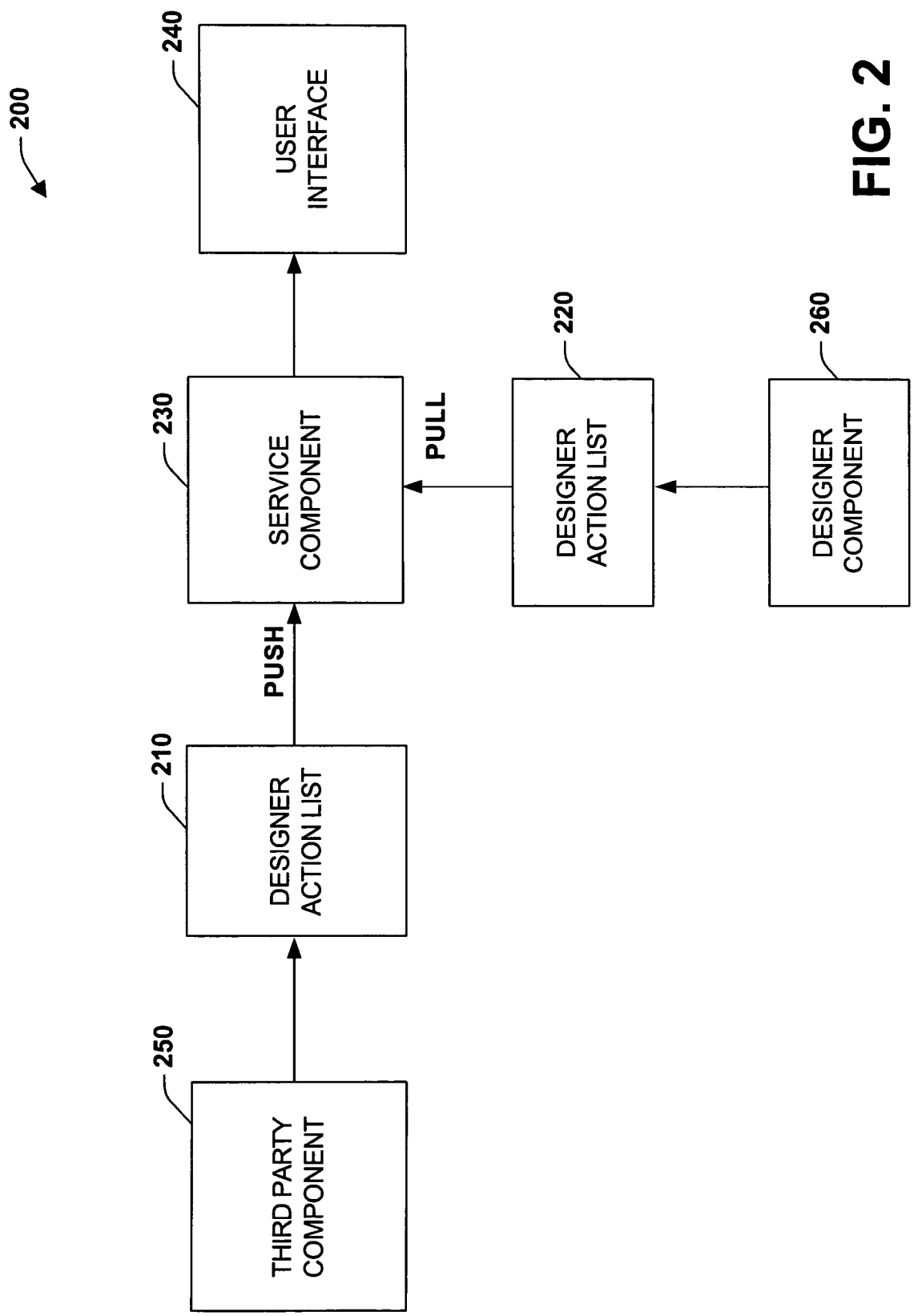
FIG. 2 is a block diagram illustrating Push and Pull model interactions in accordance with an aspect of the present invention.

Before proceeding with a discussion of FIG. 2, it is noted that one or more graphical user interfaces can be provided in accordance with the present invention. It is further noted that the respective interfaces depicted can be provided in various other different settings and context. As an example, the applications and/or models discussed herein can be associated with a desktop development tool, mail application, calendar application, and/or web browser, for example although other type applications can be utilized. These applications can be associated with a Graphical User Interface (GUI), wherein the GUI provides a display having one or more display objects (not shown) including such aspects as configurable icons, buttons, sliders, input boxes, selection options, menus, tabs and so forth having multiple configurable dimensions, shapes, colors, text, data and sounds to facilitate operations with the applications and/or models. In addition, the GUI and/or models can also include a plurality of other inputs or controls for adjusting and configuring one or more aspects of the present invention and as will be described in more detail below. This can include receiving user commands from a mouse, keyboard, speech input, web site, remote web service, and/or other device such as a camera or video input to affect or modify operations of the GUI and/or models described herein.

Referring to FIG. 2, a system 200 illustrates push and pull model interactions in accordance with an aspect of the present invention. In this aspect, the concept of pushing or pulling one or more action lists 210 or 220 from different sources is illustrated. A service component 230 analyzes and merges these lists to provide control or interface functionality at a user interface 240. With respect to pushing lists 210, a designer requests for a service and then adds commands to that service such as in this case requesting the list 210 from a third party component or provider at 250. With respect to pulling lists, a designer component 260 is queried by the service 230 for commands that are offered by the designer 260. Generally, the designer 260 enables users to add, align, position, view, manage, and/or manipulate forms and controls. A form is an object that enables the presentation of information to the user and the acceptance of input information from the user at the user interface 240. A form may expose properties and methods which define its appearance and behavior, and events which define its interaction with the user.

Before proceeding with a discussion of FIGS. 3-10, it is noted that one particular implementation for the above noted models, classes, lists and other related components are illustrated. It is to be appreciated however, that the present invention is not limited by the example implementations shown and that various other implementations are also possible. Also, before proceeding with a discussion of FIGS. 3-10, the following terminology may apply:

| Term | Definition |
| --- | --- |
| DesignerCommand | A menu command. Menu commands are delegates wired to a command ID; they do not define the command text, its placement or other "metadata." |
| DesignerVerb | A menu command that also defines its text and other metadata. Verbs are generally offered on a per-Designer basis, and are specific to the Designer. Designer verbs are generally shown on a context menu or off of the "view" menu of the main menu bar. |
| DesignerAction | A menu command that defines text and other metadata to describe a targeted action that can be performed. Actions typically walk the user through some multi-step process, such as configuring a data source for a component. |
| DesignerShortcut | A menu command that defines text and other metadata to describe a "shortcut" to the user. Designer shortcuts are more targeted than actions, and are transient; that is, a shortcut is offered in response to a specific user action, and often disappears after a few seconds, or when the user has moved on. |
| Push Model | A model where a Designer specifically asks for a service and adds commands to that service. |
| Pull Model | A model where a Designer is queried by a service for commands that it offers. |

Figure 3:
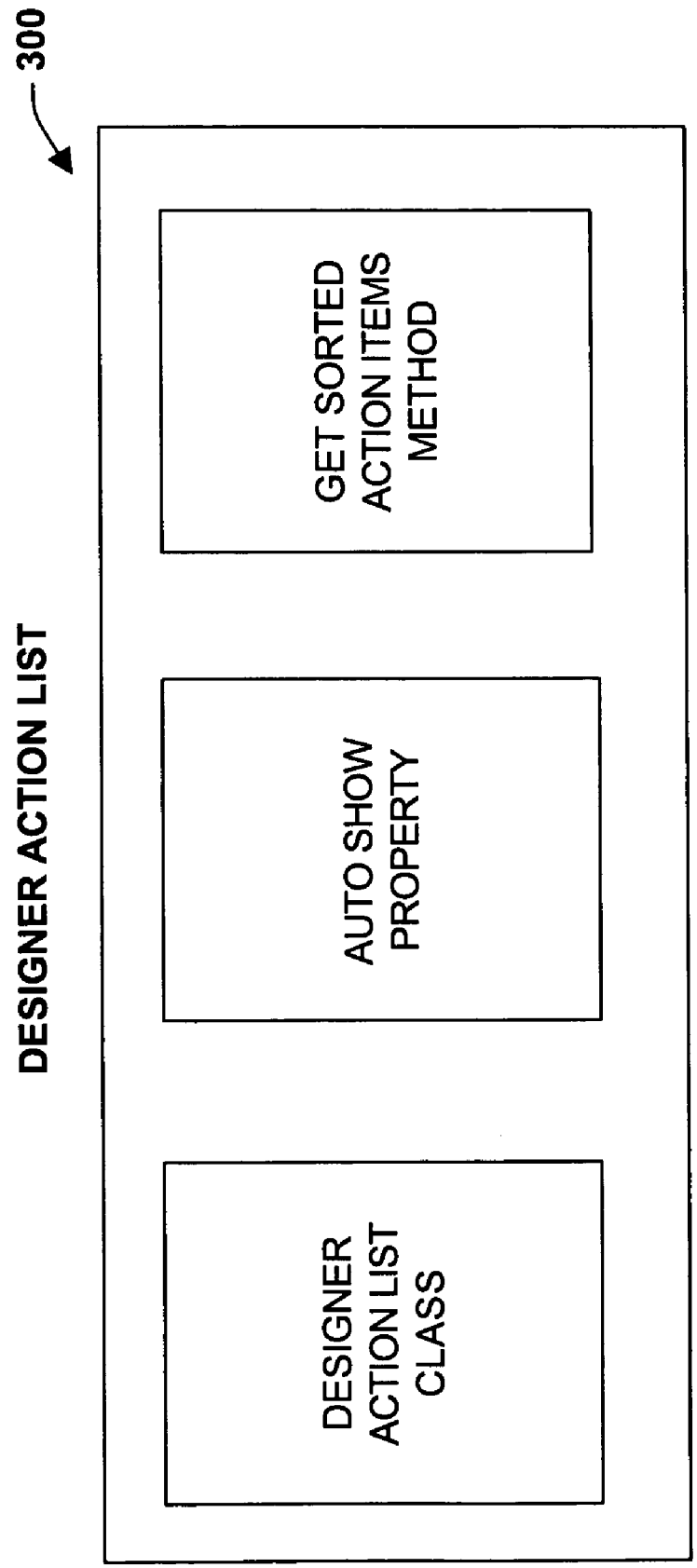
FIG. 3 is a block diagram illustrating Designer action lists in accordance with an aspect of the present invention.

Referring now to FIG. 3, Designer action lists are illustrated in accordance with an aspect of the present invention. A Designer action list 300 is the abstract base class which control or interface authors inherit from. Typical usage is to add properties and methods and then implement an abstract Get Items method to return an array of Designer Actions in the order they are to be displayed at a respective user interface. These actions can include sequences of text, audio, images, and/or video for controlling presentation of an interface to a user including output to the user and receiving input from the user. The following is an example class declaration:

```
public abstract class DesignerActionList
{
    // Properties
    public virtual boot AutoShow {get; set;}
    // Methods
    DesignerAction|| GetSortedActionItems( );
}
```

The Designer action list 300 can include a Designer action list class, an auto show property, and a get sorted action items method which are described as follows:

---
DesignerActionList Class
--- public class System.Design.DesignerActionList
                    AutoShow Property public bool AutoShow { get; set; }
Type        bool
Name        AutoShow
Behavior    If set to true, the component this Designer Action List is
            associated with will auto expand the object panel when the
            component is created.
Security
Exceptions  none
Attributes
Other
                    GetSortedActionItems Method Public abstract DesignerActionItem [ ]GetSortedActionItems ( )
Type        DesignerActionItem [ ]
Name        GetItems
Args        None
Behavior    Implementor is responsible for returning an array of
            DesignerActionItems in the order that they should be
            displayed.
            The category of the first item encountered becomes the first
            group. The next category encountered becomes the second
            group and so on.
            An item that has a category different than the current
            category and that category has already been used; it
            is placed in the matching, existing category.
            If an item doesn't have a category it is placed in a "Misc"
            category at the end
Security
Exceptions  None
Attributes
Other

---

Figure 4:
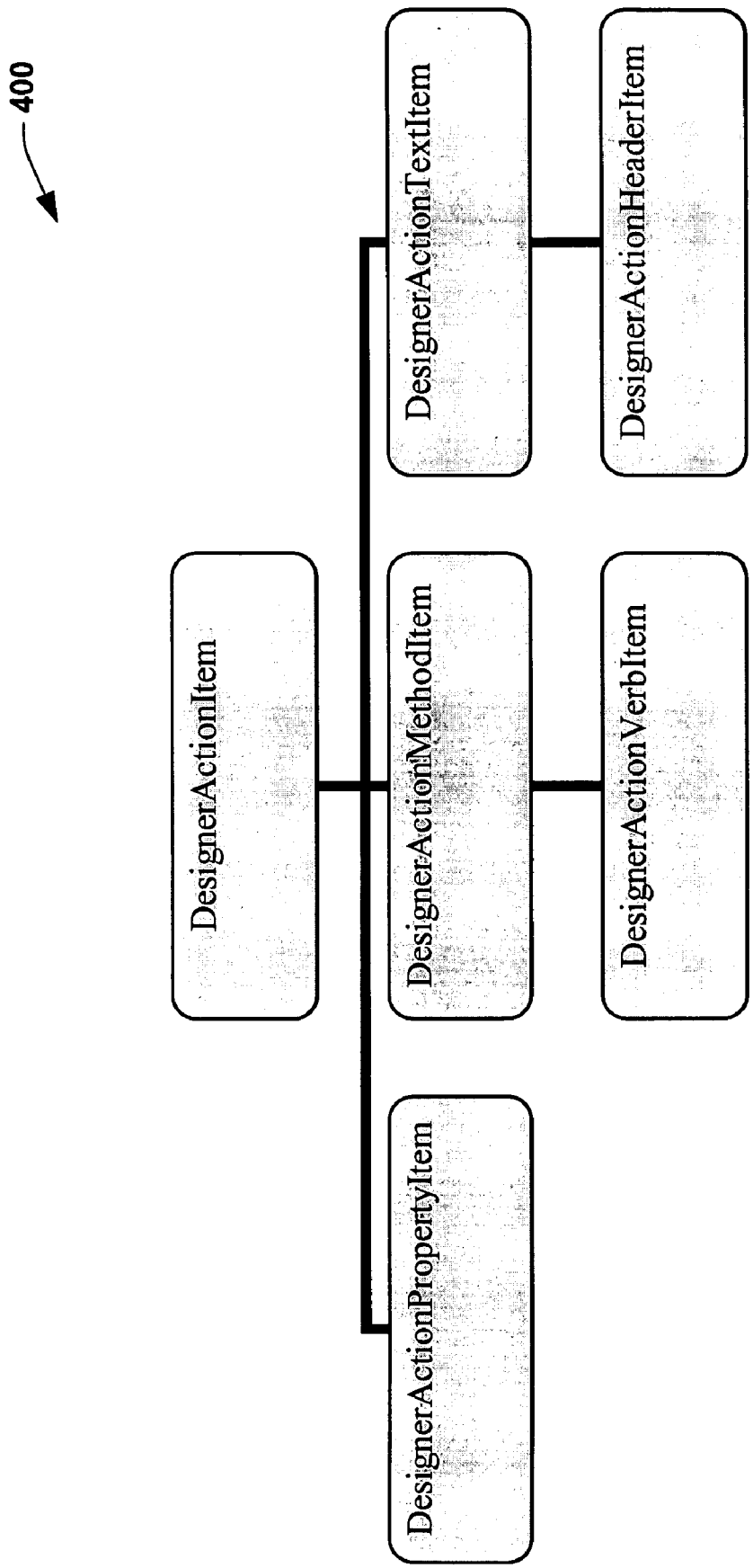
FIG. 4 is a diagram illustrating an inheritance model in accordance with an aspect of the present invention.

Referring now to FIG. 4, an inheritance model 400 is illustrated in accordance with an aspect of the present invention. In this aspect, the hierarchy 400 depicts the respective base classes for creating designer actions that may appear in a design directory or namespace. Such classes include a designer action item, a designer action property item, a designer action method item, a designer action text item, a designer action verb item, and a designer action header item which are described in more detail below with respect to FIGS. 5-10.

Turning to FIG. 5, a diagram illustrates a designer action item 500 in accordance with an aspect of the present invention. The designer action item 500 can include a designer action item class and constructor, and properties relating to categories, descriptions, display names, a property for properties, and a related item property. These items are described in more detail as follows:

---
DesignerActionItem
---

```
public abstract class DesignerActionItem
{
    // Constructor
    protected DesignerActionItem (string displayName, string
    category, string description);
    // Properties
    public string Category { get; }
    public string Description { get; }
    public string DisplayName { get; }
    public IDictionary Properties { get; }
    public DesignerActionListCollection RelatedItems { get; }
}
```

---
DesignerActionItem Class
--- public class System.Design. DesignerActionItem
                    DesignerActionItem Constructor public DesignerActionItem (string displayName, string category,
string description)
Args        String category: the category of the item
            String description: the string used in tool tips or the status
            bar for this item
            String displayName: the string to be displayed to the user
            Object image: the image associated with this item.
Behavior    Creates a new DesignerActionItem. The displayName
            argument is the string which can be shown to the user.
            The image may be used by a UI when the action is
            displayed and the description may be used by the UI in
            a tooltip or status bar, for example.
Security
Exceptions
Attributes
Other
                    Category Property public string Category { get; }
Type        String
Name        Category
Behavior    Returns the category of this item.
Security
Exceptions  none
Attributes
Other
                    Description Property public string Description { get; }
Type        String
Name        Description
Behavior    Returns the text which may be displayed in a tooltip or
            statusbar.
Security
Exceptions  none
Attributes
Other
                    DisplayName Property public string DisplayName { get; }
Type        String
Name        DisplayName
Behavior    Returns the text which should be used when displaying this
            DesignerAction to end users.
Security
Exceptions  none
Attributes
Other
                    Properties Property public IDictionary Properties { get; }
Type        IDictionary
Name        Properties
Behavior    To allow for future expansion and other tools to handle
            these items, properties on the DesignerActionItem
            are routed through a Properties dictionary.
Security
Exceptions  none
Attributes
Other
                    RelatedItems Property public DesignerActionListCollection RelatedItems { get; }
Type        DesignerActionListCollection
Name        RelatedItems
Behavior    The DesignerActionLists in this collection represent
            associated actions.
Security
Exceptions  none
Attributes
Other

---

Figure 6:
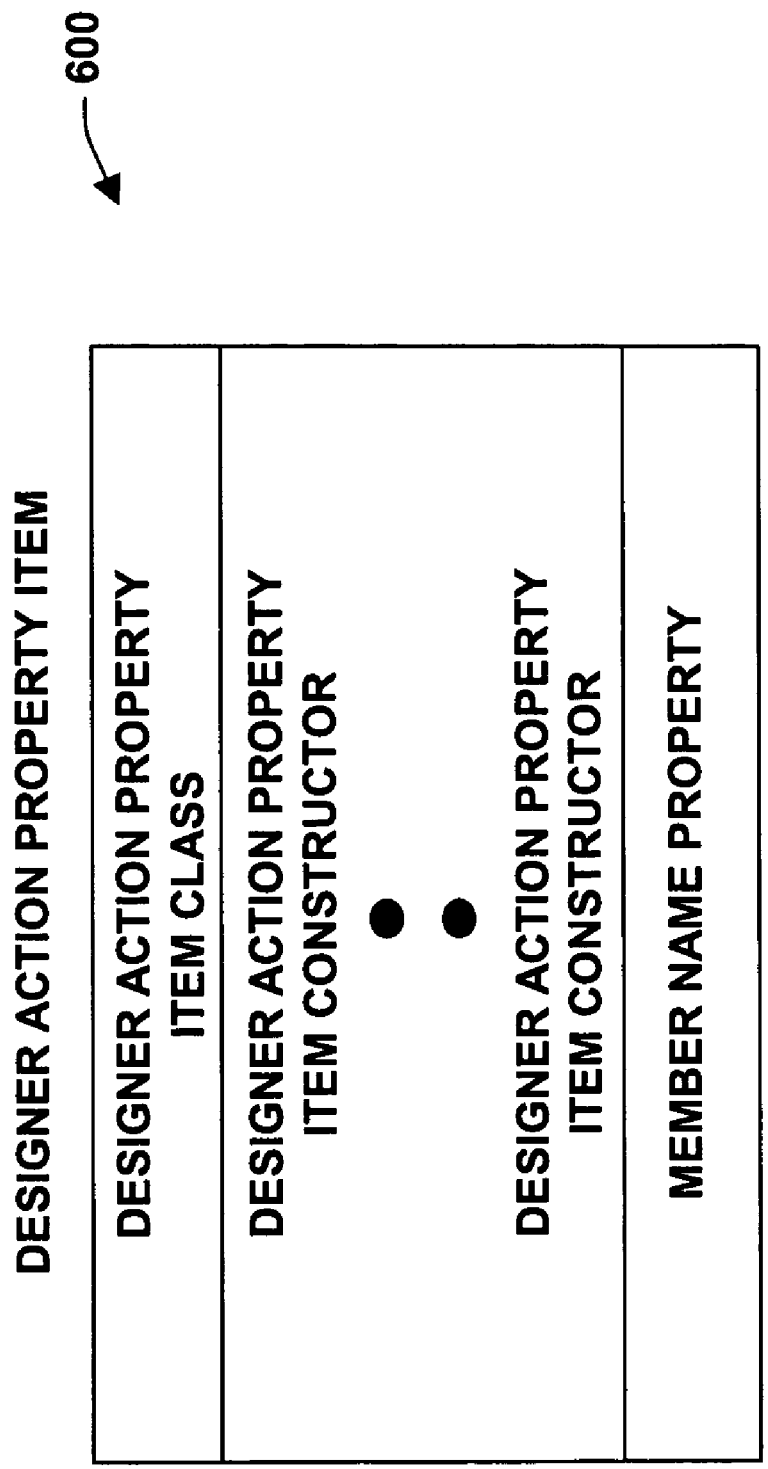
FIG. 6 is a diagram illustrating a Designer action property item in accordance with an aspect of the present invention.
Figure 7:
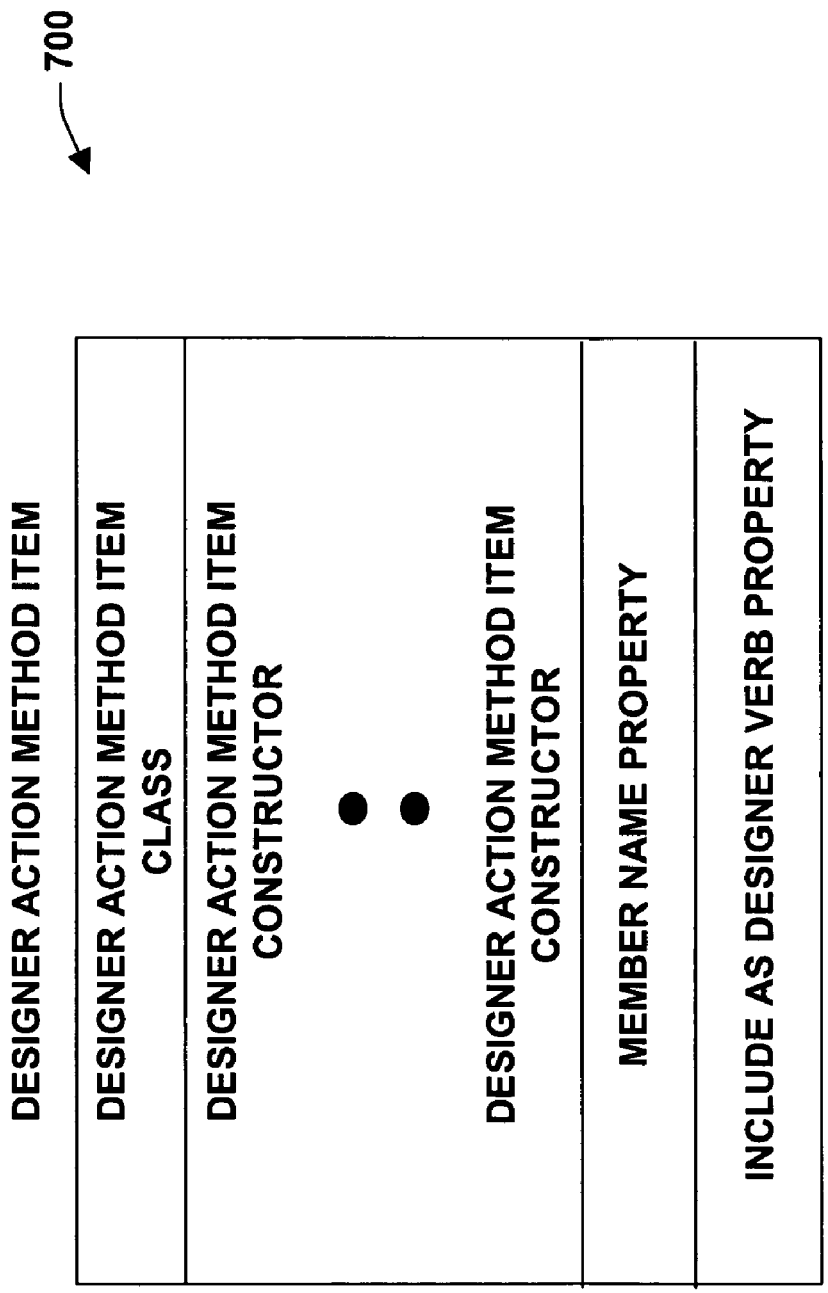
FIG. 7 is a diagram illustrating a Designer action method item in accordance with an aspect of the present invention.

Referring now to FIG. 6, a designer action property item 600 is illustrated in accordance with an aspect of the present invention. The item 600 can include a designer action property or various constructors, and a member name property, for example. These components are described as follows:

---

DesignerActionPropertyItem

```
public sealed class DesignerActionPropertyItem : DesignerActionItem
{
    // Constructor
    public DesignerActionPropertyItem(string memberName,
        string displayName);
```

-continued

DesignerActionPropertyItem

```
    public DesignerActionPropertyItem(string memberName,
        string displayName, string category);
    public DesignerActionPropertyItem(string memberName,
        string displayName, string category, string description);
    // Properties
    public string MemberName { get; }
}
```

---

DesignerActionPropertyItem Class public class System.Design. DesignerActionPropertyItem DesignerActionPropertyItem Constructor public DesignerActionPropertyItem (string memberName, string displayName, string category, string description)
Args      String memberName: the name of the member to add
           String displayName: the string to be displayed to the user
           String category: the category of the item. This is used for grouping
           String description: the string possibly used by the UI in tooltips and status bars.
Behavior  Creates a new DesignerActionPropertyItem based on a property or member defined in an ActionList implementation. The displayName argument is the string which can be shown to the user. The category argument is used for grouping items together. The description argument may be used by the UI for tooltips and statusbars, for example.
Security
Exceptions
Attributes
Other DesignerActionPropertyItem Constructor public DesignerActionPropertyItem (string memberName, string displayName, string category, string description)
Args      String memberName: the name of the member to add
           String displayName: the string to be displayed to the user
           String category: the category of the item. This is used for grouping
Behavior  Creates a new DesignerActionPropertyItem based on a property or member defined in an ActionList implementation. The displayName argument is the string which will be shown to the user. The category argument is used for grouping items together.
Security
Exceptions
Attributes
Other DesignerActionPropertyItem Constructor public DesignerActionPropertyItem (string memberName, string displayName, string category, string description)
Args      String memberName: the name of the member to add
           String displayName: the string to be displayed to the user
Behavior  Creates a new DesignerActionPropertyItem based on a property or member defined in an ActionList implementation. The displayName argument is the string which can be shown to the user.
Security
Exceptions
Attributes
Other MemberName Property public string MemberName { get; }
Type        String
Name      MemberName
Behavior  Returns the name of the property or method which this DesignerAction is linked to.
Security
Exceptions  none
Attributes
Other Referring to FIG. 7, a designer action method item 700 is illustrated in accordance with an aspect of the present invention. The designer action method item 700 includes a method item class, various method item constructors, a member name property and an include as verb property which are described as follows:

| DesignerActionMethodItem |
|---|
| public sealed class DesignerActionMethodItem : DesignerActionItem<br>{<br>    // Constructor<br>    public DesignerActionMethodItem (DesignerActionList actionList, string memberName, string displayName, string category, string description, bool includeAsDesgnerVerb);<br>    public DesignerActionMethodItem (DesignerActionList actionList, string memberName, string displayName);<br>    public DesignerActionMethodItem (DesignerActionList actionList, string memberName, string displayName, bool |

-continued

| DesignerActionMethodItem |
|---|
| includeAsDesignerVerb);<br>    public DesignerActionMethodItem (DesignerActionList actionList, string memberName, string displayName, string category);<br>    public DesignerActionMethodItem (DesignerActionList actionList, string memberName, string displayName, string category, bool includeAsDesignerverb);<br>    public DesignerActionMethodItem (DesignerActionList actionList, string memberName, string displayName, string category, string description);<br>    // Properties<br>    public string MemberName { get; }<br>    public bool IncludeAsDesignerVerb { get; }<br>    // Methods<br>    public virtual void Invoke( )<br>} |

| DesignerActionMethodItem Class |
|---| public class System.Design. DesignerActionMethodItem

| DesignerActionMethodItem Constructor |
|---| public DesignerActionMethodItem (DesignerActionList actionList, string memberName, string displayName)

| | |
|---|---|
| Args | DesignerActionList actionList: the instance of the DesignerActionList where this method is implemented. Used for invocation<br>String memberName: the name of the member to add<br>String displayName: the string to be displayed to the user |
| Behavior | Creates a new DesignerActionMethodItem based on a property or member defined in an ActionList implementation. The displayName argument is the string which can be shown to the user. |
| Security | |
| Exceptions | |
| Attributes | |
| Other | |

| DesignerActionMethodItem Constructor |
|---| public DesignerActionMethodItem (DesignerActionList actionList, string memberName, string displayName, string category, string description)

| | |
|---|---|
| Args | DesignerActionList actionList: the instance of the DesignerActionList where this method is implemented. Used for invocation<br>String memberName: the name of the member to add<br>String displayName: the string to be displayed to the user<br>Bool IncludeAsDesigenrVerb: Specifies whether to include this action as a designer verb in the Verbs collection on the control's designer. |
| Behavior | Creates a new DesignerActionMethodItem based on a property or member defined in an ActionList implementation. The displayName argument is the string which can be shown to the user. |
| Security | |
| Exceptions | |
| Attributes | |
| Other | |

| DesignerActionMethodItem Constructor |
|---| public DesignerActionMethodItem (DesignerActionList actionList, string memberName, string displayName, string category, string description)

| | |
|---|---|
| Args | DesignerActionList actionList: the instance of the DesignerActionList where this method is implemented. Used for invocation<br>String memberName: the name of the member to add<br>String displayName: the string to be displayed to the user<br>String category: the category of the item. This is used for grouping |
| Behavior | Creates a new DesignerActionMethodItem based on a property or member defined in an ActionList implementation. The displayName argument is the string which will be shown to the user. The category argument is used for grouping items together. |
| Security | |
| Exceptions | |
| Attributes | |
| Other | |

-continued

DesignerActionMethodItem Constructor public DesignerActionMethodItem (DesignerActionList actionList, string memberName, string displayName, string category, string description)

| | |
|---|---|
| Args | DesignerActionList actionList: the instance of the DesignerActionList where this method is implemented. Used for invocation |
| | String memberName: the name of the member to add |
| | String displayName: the string to be displayed to the user |
| | String category: the category of the item. This is used for grouping |
| | Bool IncludeAsDesigenrVerb: Specifies whether to include this action as a designer verb in the Verbs collection on the control's designer. |
| Behavior | Creates a new DesignerActionMethodItem based on a property or member defined in an ActionList implementation. The displayName argument is the string which can be shown to the user. The category argument is used for grouping items together. |
| Security | |
| Exceptions | |
| Attributes | |
| Other | |

DesignerActionMethodItem Constructor public DesignerActionMethodItem (DesignerActionList actionList, string memberName, string displayName, string category, string description)

| | |
|---|---|
| Args | DesignerActionList actionList: the instance of the DesignerActionList where this method is implemented. Used for invocation |
| | String memberName: the name of the member to add |
| | String displayName: the string to be displayed to the user |
| | String category: the category of the item. This is used for grouping |
| | String description: the string possibly used by the UI in tooltips and statusbars, for example. |
| Behavior | Creates a new DesignerActionMethodItem based on a property or member defined in an ActionList implementation. The displayName argument is the string which will be shown to the user. The category argument is used for grouping items together. The description argument may be used by the UI for tooltips and statusbars. |
| Security | |
| Exceptions | |
| Attributes | |
| Other | |

DesignerActionMethodItem Constructor public DesignerActionMethodItem (DesignerActionList actionList, string memberName, string displayName, string category, string description)

| | |
|---|---|
| Args | DesignerActionList actionList: the instance of the DesignerActionList where this method is implemented. Used for invocation |
| | String memberName: the name of the member to add |
| | String displayName: the string to be displayed to the user |
| | String category: the category of the item. This is used for grouping |
| | String description: the string possibly used by the UI in tooltips and statusbars |
| | Bool IncludeAsDesigenrVerb: Specifies whether to include this action as a designer verb in the Verbs collection on the control's designer. |
| Behavior | Creates a new DesignerActionMethodItem based on a property or member defined in an ActionList implementation. The displayName argument is the string which can be shown to the user. The category argument is used for grouping items together. The description argument may be used by the UI for tooltips and statusbars. |
| Security | |
| Exceptions | |
| Attributes | |
| Other | |

MemberName Property public string MemberName { get; }

| | |
|---|---|
| Type | String |
| Name | MemberName |
| Behavior | Returns the name of the property or method which this DesignerAction is linked to. |
| Security | |
| Exceptions | none |
| Attributes | |
| Other | |

IncludeAsDesignerVerb Property public string IncludeAsDesignerVerb { get; }

| | |
|---|---|
| Type | bool |
| Name | IncludeAsDesignerVerb |
| Behavior | Returns whether or not this DesignerAction should be merged with the designer verb collection on a component's designer. |

| | |
|---|---|
| Security | |
| Exceptions | none |
| Attributes | |
| Other | |

Figure 8:
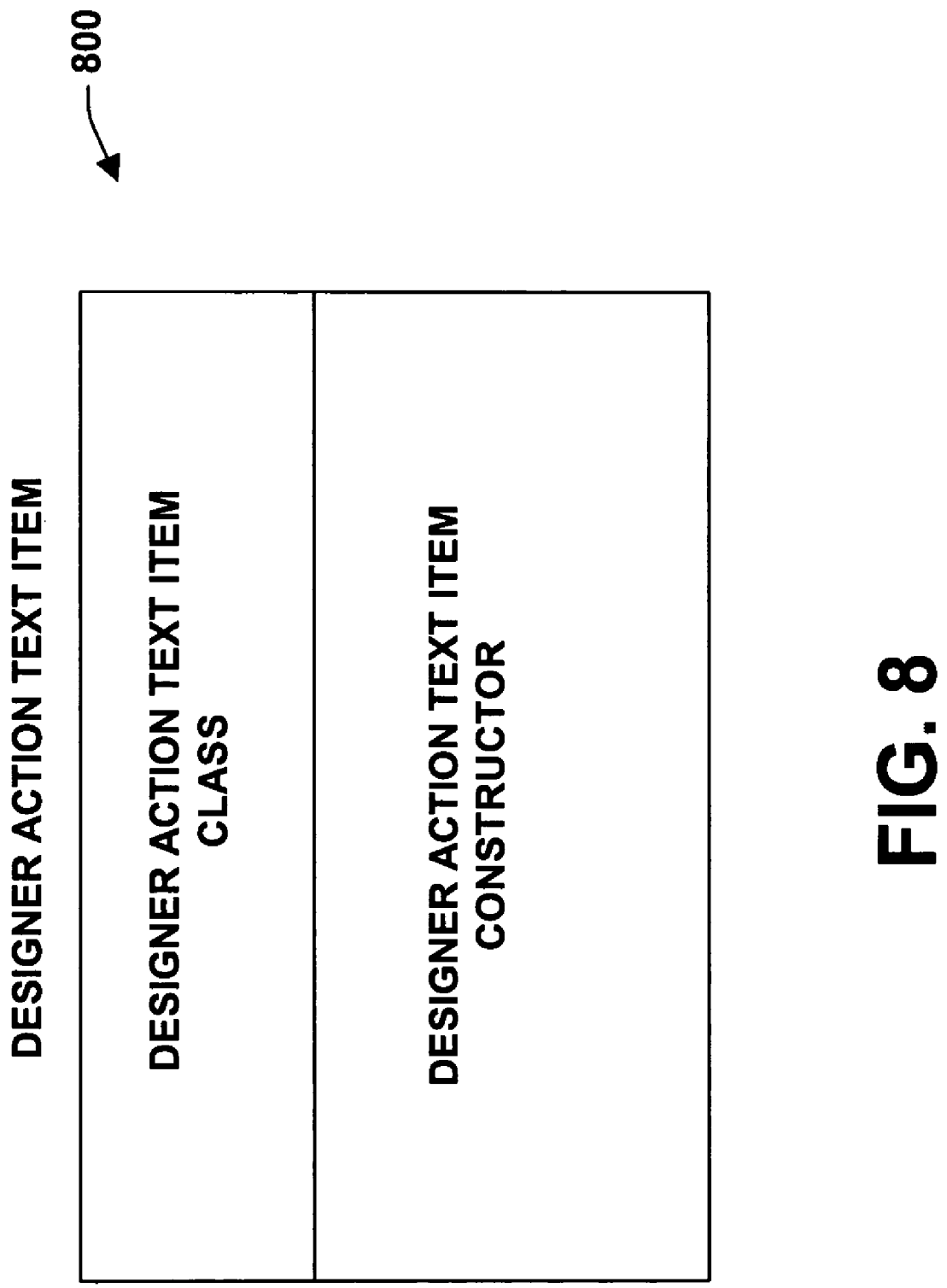
FIG. 8 is diagram illustrating a Designer action text item in accordance with an aspect of the present invention.

Referring now to FIG. 8, a designer action text item 800 is illustrated in accordance with an aspect of the present invention. The designer action text item 800 includes a text item class and constructor and is described as follows:

DesignerActionTextItem

This is a DesignerActionItem that is displayed as a line of text. This can be used to create a label in an ActionList, for example.

```
public sealed class DesignerActionTextItem : DesignerActionItem
{
    // Constructor
    public DesignerActionTextItem (string displayName) :
        base(displayName, null, null, null) { }
}
```

| DesignerActionTextItem Class | |
|---|---|
| public class System.Design. DesignerActionTextItem | |
| DesignerActionTextItem Constructor | |
| public DesignerActionTextItem (string displayName) | |
| Args | String displayName: the string to be displayed to the user |
| Behavior | Creates a new DesignerActionTextItem. |
| Security | |
| Exceptions | none |
| Attributes | |
| Other | |

Figure 9:
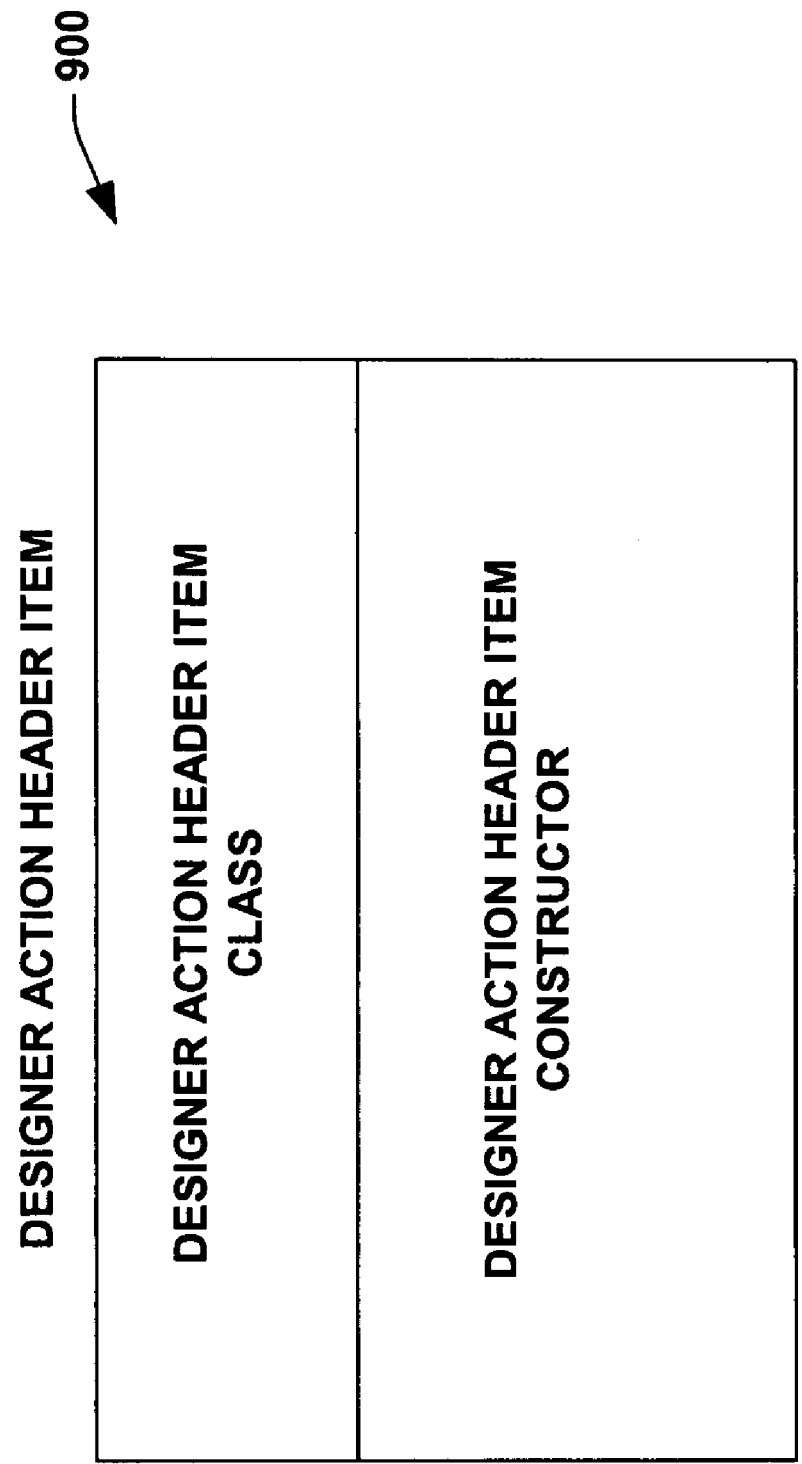
FIG. 9 is diagram illustrating a Designer action-header item in accordance with an aspect of the present invention.

FIG. 9 illustrates a designer action header item 900 in accordance with an aspect of the present invention. The header item 900 includes an item class and an item constructor and is described as follows:

DesignerActionHeaderItem

This is a DesignerActionItem that is displayed as a bolded line of text. This can be used to create a header in an ActionList.

```
public sealed class DesignerActionHeaderItem : DesignerActionTextItem
{
    // Constructor
    public DesignerActionHeaderItem (string displayName) :
        base(displayName, null, null, null) { }
}
```

| DesignerActionHeaderItem Class | |
|---|---|
| public class System.Design. DesignerActionHeaderItem | |
| DesignerActionHeaderItem Constructor | |
| public DesignerActionHeaderItem (string displayName) | |
| Args | String displayName: the string to be displayed to the user |
| Behavior | Creates a new DesignerActionHeaderItem. |
| Security | |
| Exceptions | none |
| Attributes | |
| Other | |

FIG. 10 illustrates a designer action verb item 1000 in accordance with an aspect of the present invention. The verb item 1000 includes a verb item class and a verb item constructor which is described as follows:

DesignerActionVerbItem

This is a DesignerActionMethodItem that is based on a DesignerVerb. It takes a DesignerVerb in it's constructor and it's properties are mapped through to the appropriate properties on the DesignerVerb.

```
public sealed class DesignerActionVerbItem : DesignerActionMethodItem
{
    // Constructor
    public DesignerActionVerbItem (DesignerVerb verb)
}
```

| DesignerActionVerbItem Class | |
|---|---|
| public class System.Design. DesignerActionVerbItem | |
| DesignerActionVerbItem Constructor | |
| public DesignerActionVerbItem (DesignerVerb verb) | |
| Args | DesignerVerb verb: The DesignerVerb used to create the item. |
| Behavior | Creates a new DesignerActionVerbItem. The Category is set to "Verbs". The Description is set to the Description property of the verb. The DisplayName is set to the Text of the verb. The MemberName is set to null and IncludeAsDesignerVerb is set to false. Invoke is overridden to call the Invoke method on the verb. |
| Security | |
| Exceptions | none |
| Attributes | |
| Other | |

Figure 11:
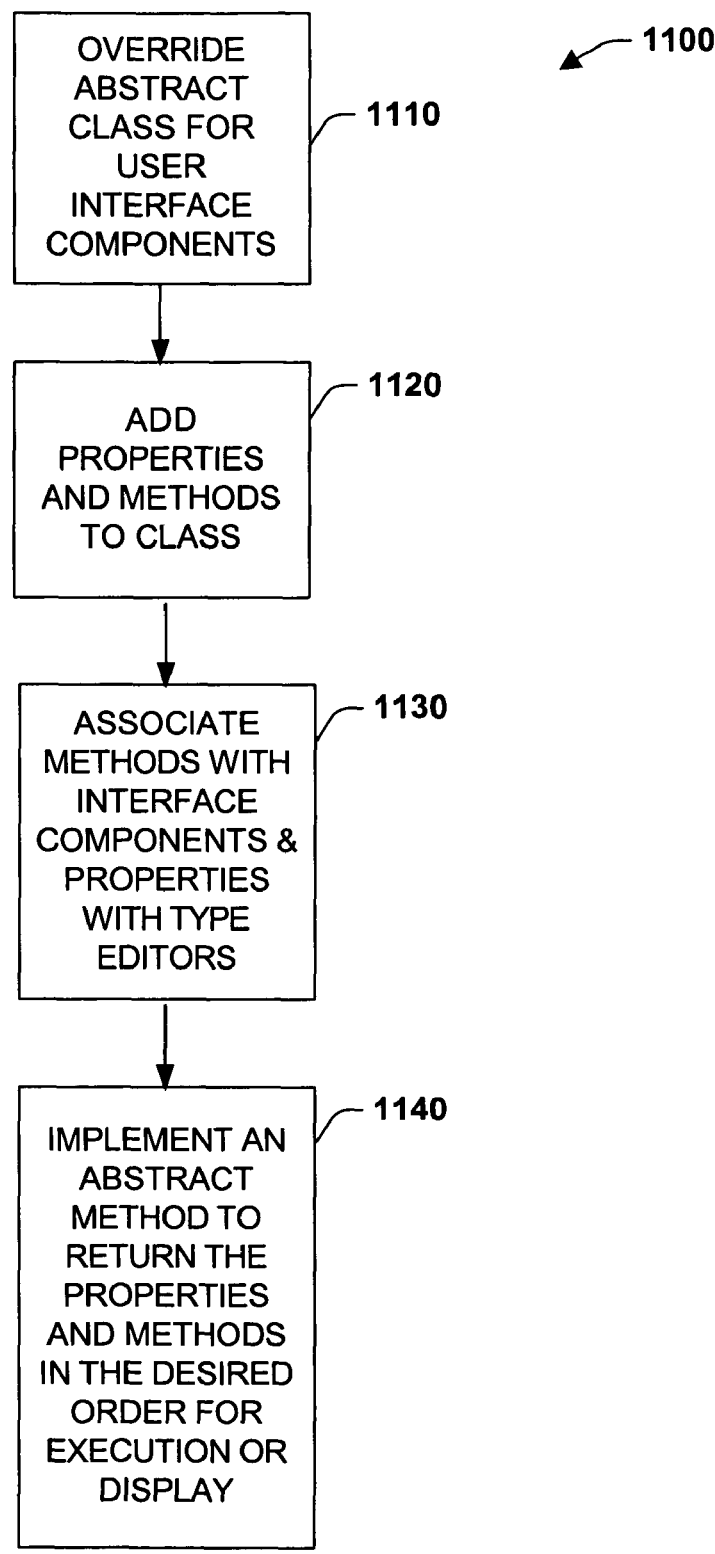
FIG. 11 is a flow diagram illustrating a class-based user interface generation process according to an aspect of the present invention.

FIG. 11 illustrates a methodology 1100 for providing class-base interfaces in accordance the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 1100, an abstract class is overridden and a model is provided that describes various user interface components and actions. At 1120, the model facilitates creating a new class and adding associated properties and methods. At 1130, the methods provide interface components such as buttons, display objects, or other interface components on an interface display panel and the properties are associated with user interface type editors of the property's type. At 1140, a control developer then implements a method to return the properties and methods in the desired order that the properties and methods should be displayed. As noted above, when the class is created, it can be added to a control or interface such as via a Pull model that enables inheriting classes to provide other classes and for their items to be merged and/or via a Push model associated with a service which user code can push or store Action List classes into.

After the classes have been declared, a user interface can provide user interface actions based upon generic descriptions of actions from the respective class. Such actions can include temporal sequences, audio sequences, video sequences, intermittent interface options, transient interface options, a plurality of various output displays and/or input options that can be associated with an interface or be employed to create the interface.

Figure 12:
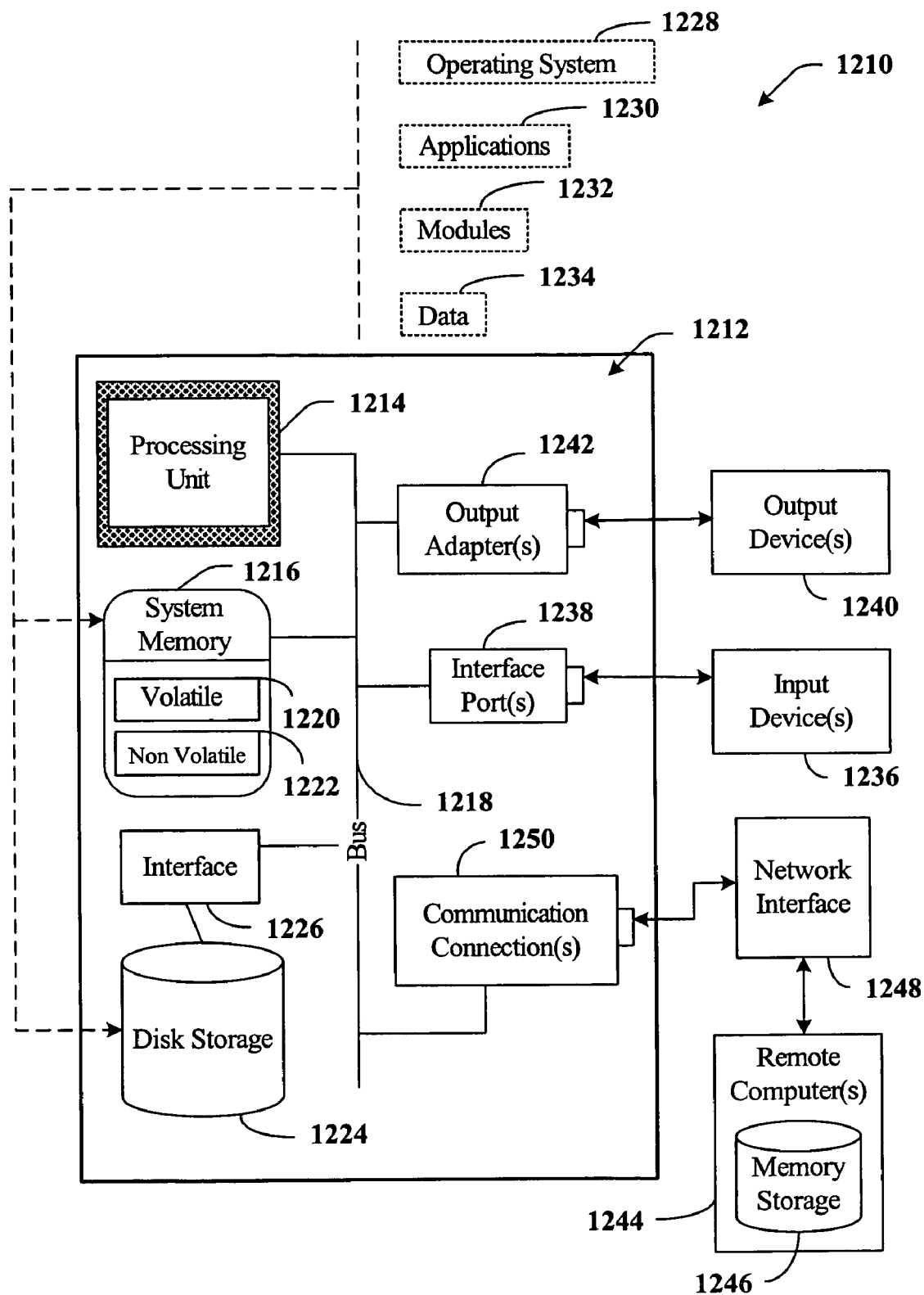
FIG. 12 is a schematic block diagram illustrating a suitable operating environment in accordance with an aspect of the present invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multi-processor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
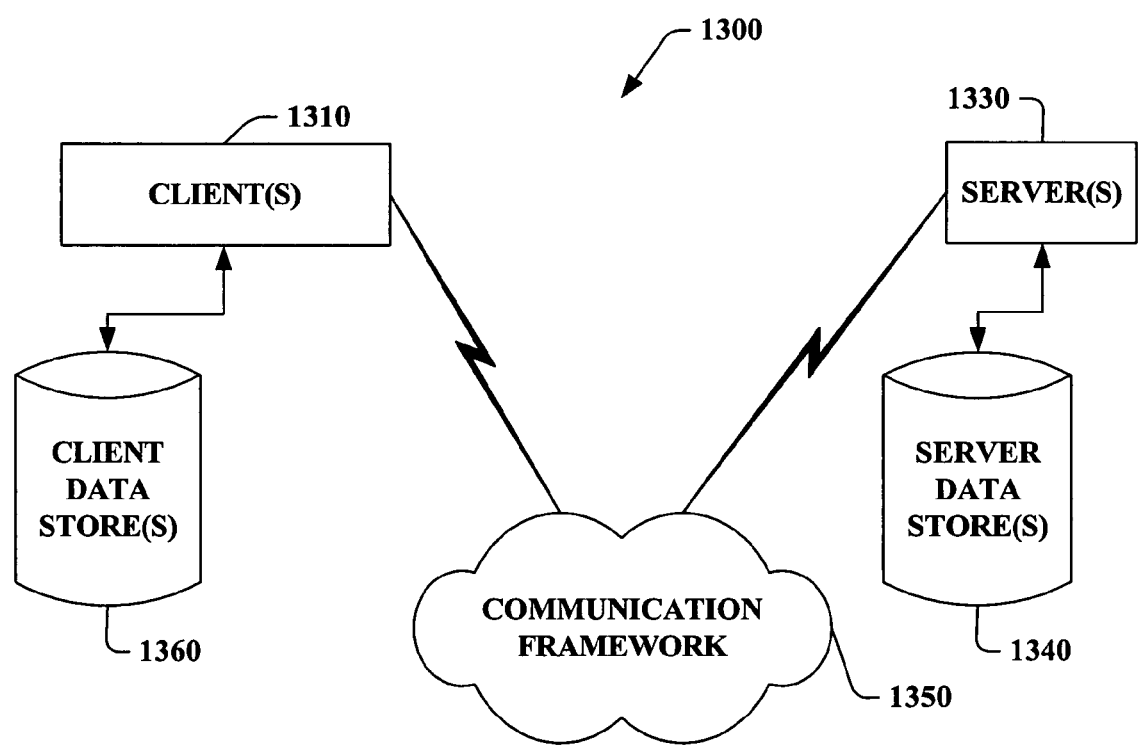
FIG. 13 is a schematic block diagram of a sample-computing environment with which the present invention can interact.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates generating a user interface, comprising the following components stored in computer storage media:

a class component that defines properties and methods associated with one or more user interface actions;

a designer action object model that includes an action list, wherein the action list is an abstract base class from which various portions of user interface code can inherit, the action list being configured to specify interface actions or events in a generalized manner for appearance on a user interface, the action list further including properties and commands associated with the specified interface actions that change dynamically over time based on a state of at least one object, as well as one or more transitory components that are provided in the action list only until a particular task related to the action list has been achieved, the designer action object model being configured to perform the following: merging a plurality of action lists from one or more different sources into a single action list for use by the class component and associating one or more action lists with the class component; and a service component that determines which actions or interface options appear within the user interface and parses the class to automatically generate at least a portion of a user interface from the interface actions based at least in part upon the state of the at least one ether object, a development environment or an execution environment.

2. The system of claim 1, further comprising a component to order and filter a set of user interface actions defined in an action list.

3. The system of claim 2, the order and filter component includes an abstract method or an interface method to provide an ordered set of actions.

4. The system of claim 3, at least one of the abstract or the interface methods declare one or more interface components and the properties describe a user interface type editor.

5. The system of claim 1, further comprising at least one of a push or a pull model to distribute the action lists.

6. The system of claim 1, the state of the at least one object is transmitted through object metadata.

7. The system of claim 6, wherein interface components are automatically added or removed from an interface based upon the state.

8. The system of claim 1, wherein one or more action lists specify a panel attached to a control's selection user interface wherein the control is comprised within the user interface.

9. The system of claim 8, the panel provides tasks to at least one of bring up a modal user interface, operate directly on a component or allow a selection on the component.

10. The system of claim 9, the interface is associated with a wizard, a tool tip, a helper command, or a status bar.

11. The system of claim 9, the user interface further comprising at least one of forms, controls, components, display objects, audio, video, or text strings.

12. The system of claim 9, the user interface is associated with at least one of a web application, an XML application, a development tool, a mail application, a calendar application, a graphics application, and a text application.

13. The system of claim 1, the interface actions are supplied by a third party developer.

14. The system of claim 1, further comprising a designer component that enables users to add, align, position, view, manage, or manipulate forms and controls.

15. The system of claim 14, further comprising at least one of a designer command, a designer verb, a designer action, and a designer short cut, a designer action list, and a designer verb list.

16. A computer readable medium having computer readable instructions stored thereon for implementing the following components comprising at least:

an abstract class component that defines properties and methods associated with one or more interface actions, wherein one or more action lists comprised within the abstract class component are edited by a developer and parsed to determine which actions or events appear on a user interface derived from the class component, and wherein the class component is associated with a designer action object model that at least one of specifies a list of properties and commands that includes an action list, wherein the action list is an abstract base class from which various portions of user interface code can inherit, the action list being configured to specify interface actions or events in a generalized manner for appearance on a user interface, the action list further including properties and commands associated with the specified interface actions that change dynamically over time based on a state of at least one object, as well as one or more transitory components that are provided in the action list only until a particular task related to the action list has been achieved, the designer action object model being configured to perform the following: merging a plurality of action lists from one or more different sources into a single action list for use by the class component and associating one or more action lists with the class component;

a service component that overrides the abstract class component to provide a model for at least a portion of a user interface; and a generating component for automatically generating at least a portion of the interface from the interface actions based at least in part upon the state of the at least one object.

17. A system that facilitates generation of a user interface, comprising the following means executed by a processor:

means for defining abstract class parameters representative of methods and properties of an interface, which class parameters are edited by a developer;

means for specifying a list of properties and commands, wherein the means for specifying includes a designer action object model that includes an action list, wherein the action list is an abstract base class from which various portions of user interface code can inherit, the action list being configured to specify interface actions or events in a generalized manner for appearance on a user interface, the action list further including properties and commands associated with the specified interface actions that change dynamically over time based on a state of at least one object, as well as one or more transitory components that are provided in the action list only until a particular task related to the action list has been achieved, the designer action object model being configured to perform the following: merging a plurality of action lists from one or more different sources into a single action list for use by the class component and associating one or more action lists with the class component;

means for identifying a property or a command to be used at a specific time in the user interface from the list of properties and commands;

means for parsing the class parameters; and means for automatically generating at least a portion of the interface based in part on the abstract class parameters.

18. The system of claim 17, further comprising means for pushing or pulling the class parameters into the interface.

19. A method that facilitates automatic generation of a user interface, comprising:

defining properties and methods associated with one or more user interface actions;

providing a designer action object model that includes an action list, wherein the action list is an abstract base class from which various portions of user interface code can inherit, the action list being configured to specify interface actions or events in a generalized manner for appearance on a user interface, the action list further including properties and commands associated with the specified interface actions that change dynamically over time based on a state of at least one object, as well as one or more transitory components that are provided in the action list only until a particular task related to the action list has been achieved, the designer action object model being configured to perform the following: merging a plurality of action lists from one or more different sources into a single action list for use by the class component and associating one or more action lists with the class component; and determining which actions or interface options appear within the user interface and parses the class to automatically generate at least a portion of a user interface from the interface actions based at least in part upon the state of the at least one object, a development environment or an execution environment.

20. The method of claim 19, further comprising automatically exposing or removing an interface option based at least in part on the state of an object associated with the interface components.

21. A computer readable storage medium having a data structure stored thereon, comprising:

a class component to store properties and methods relating to an user interface, wherein the class component is associated with a designer action object model that includes an action list, wherein the action list is an abstract base class from which various portions of user interface code can inherit, the action list being configured to specify interface actions or events in a generalized manner for appearance on a user interface, the action list further including properties and commands associated with the specified interface actions that change dynamically over time based on a state of at least one object, as well as one or more transitory components that are provided in the action list only until a particular task related to the action list has been achieved, the designer action object model being configured to perform the following: merging a plurality of action lists from one or more different sources into a single action list for use by the class component and associating one or more action lists with the class component;

the one or more action lists comprised within the class component that are edited by a developer and are parsed to determine which actions or events appear on the user interface derived from the class component;

a first field defining at least one interface component associated with the methods;

a second field defining at least one editor component associated with the properties; and a generating component for automatically generating at least a portion of the interface from the interface actions based at least in part upon the state of the at least one object.

22. The computer readable storage medium of claim 21, further comprising a field to define one or more actions of a user interface.

23. The computer readable storage medium of claim 22, the actions are associated with at least one of a designer action item, a designer action property item, a designer action method item, a designer action text item, a designer action verb item, and a designer action header item.

* * * * *

UNITED STATES PATENT AND TRADEMARK OFFICE
CERTIFICATE OF CORRECTION

| | | |
|---|---|---|
| PATENT NO. | : 7,721,219 B2 | |
| APPLICATION NO. | : 10/909512 | |
| DATED | : May 18, 2010 | |
| INVENTOR(S) | : Michael R. Harsh et al. | |

It is certified that error appears in the above-identified patent and that said Letters Patent is hereby corrected as shown below:

In column 20, line 8, in Claim 1, after "one" delete "ether".

Signed and Sealed this
Eighth Day of February, 2011

David J. Kappos
*Director of the United States Patent and Trademark Office*